United States Patent
Seyffert et al.

(10) Patent No.: US 12,030,457 B2
(45) Date of Patent: Jul. 9, 2024

(54) METHOD FOR A SEATBELT SYSTEM, SEATBELT SYSTEM FOR A VEHICLE, AND VEHICLE COMPRISING A SEATBELT SYSTEM

(71) Applicant: ZF AUTOMOTIVE GERMANY GMBH, Alfdorf (DE)

(72) Inventors: Martin Seyffert, Pfullingen (DE); Karl Birk, Ebersbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 68 days.

(21) Appl. No.: 17/789,708

(22) PCT Filed: Dec. 18, 2020

(86) PCT No.: PCT/EP2020/086932
§ 371 (c)(1),
(2) Date: Jun. 28, 2022

(87) PCT Pub. No.: WO2021/136684
PCT Pub. Date: Jul. 8, 2021

(65) Prior Publication Data
US 2023/0031409 A1 Feb. 2, 2023

(30) Foreign Application Priority Data

Dec. 31, 2019 (DE) .................. 10 2019 135 923.6
Dec. 31, 2019 (DE) .................. 10 2019 135 924.4

(51) Int. Cl.
*B60R 22/48* (2006.01)
*B60R 21/01* (2006.01)
(Continued)

(52) U.S. Cl.
CPC ........ *B60R 22/48* (2013.01); *B60R 21/01544* (2014.10); *B60R 22/24* (2013.01);
(Continued)

(58) Field of Classification Search
CPC ... B60R 22/48; B60R 21/01544; B60R 22/24; B60R 2022/4808; B60R 2022/4816; B60R 2022/4866
(Continued)

(56) References Cited

U.S. PATENT DOCUMENTS

| 6,853,298 B1* | 2/2005 | Stojanowski | ........... B60R 22/48 340/384.1 |
| 2019/0275973 A1* | 9/2019 | Göring | ................... G06N 3/044 |
| 2020/0331427 A1* | 10/2020 | Abro | ..................... B60R 22/02 |

FOREIGN PATENT DOCUMENTS

| DE | 10307535 A1 * | 9/2004 | ........... B60R 22/023 |
| DE | 10307535 A1 | 9/2004 | |

(Continued)

OTHER PUBLICATIONS

PCT International Search Report for corresponding International Application Serial No. PCT/EP2020/086932, mailed May 4, 2021, pp. 1-4.

*Primary Examiner* — Kam Wan Ma
(74) *Attorney, Agent, or Firm* — TAROLLI, SUNDHEIM, COVELL & TUMMINO L.L.P.

(57) ABSTRACT

A method for a seat belt system (10) in a vehicle (14), the seat belt system (10) comprising a control unit (36) and at least one seat belt (18) with an extendable webbing (20) and a webbing extension measuring device (30), includes the steps of:
  a) determining whether a vehicle seat (16) is occupied,
  b) determining whether the webbing (20) is in a storage position, if the vehicle seat (16) is not occupied, and
  c) outputting a warning signal, in particular via an output device (34), if the webbing (20) is not in the storage position.

(Continued)

Moreover, the invention provides a seat belt system (10) for a vehicle (14) comprising an extendable seat belt (17, 18) as well as a vehicle (14) comprising a seat belt system (10).

18 Claims, 3 Drawing Sheets (51) Int. Cl.
*B60R 21/015* (2006.01)
*B60R 22/24* (2006.01)

(52) U.S. Cl.
CPC ............... *B60R 2021/01204* (2013.01); *B60R 2021/01265* (2013.01); *B60R 2022/4808* (2013.01); *B60R 2022/4816* (2013.01); *B60R 2022/4866* (2013.01)

(58) Field of Classification Search
USPC ...................................................... 340/457.1
See application file for complete search history.

(56) References Cited

FOREIGN PATENT DOCUMENTS

| | | | | |
|---|---|---|---|---|
| DE | 102009024630 A1 | * | 1/2010 | ............. B60R 22/48 |
| DE | 102009024630 A1 | | 1/2010 | |
| DE | 102010023491 A1 | | 1/2011 | |
| DE | 102013014702 A1 | | 3/2015 | |
| DE | 102015204815 A1 | | 9/2016 | |
| DE | 102018124799 A1 | | 4/2019 | |
| DE | 102018203683 A1 | | 9/2019 | |
| WO | 2016/0202731 A1 | | 12/2016 | |

* cited by examiner

METHOD FOR A SEATBELT SYSTEM, SEATBELT SYSTEM FOR A VEHICLE, AND VEHICLE COMPRISING A SEATBELT SYSTEM

RELATED APPLICATIONS

This application is a U.S. National Stage Application filed under 35 USC 371, claiming priority to Serial No. PCT/EP2020/086932, filed on 18 Dec. 2020; which claims priority from German Patent Application DE 10 2019 135 923.6, filed 31 Dec. 2019, and German Patent Application DE 10 2019 135 924.4, filed 31 Dec. 2019, the entireties of which are hereby incorporated herein by reference.

TECHNICAL FIELD

The invention relates to a method for a seat belt system in a vehicle, the seat belt system comprising an extendable seat belt. Moreover, the invention relates to a seat belt system for a vehicle and to a vehicle comprising such a seat belt system.

BACKGROUND

Seat belt systems for vehicles are basically known. They have the function of restraining a vehicle occupant belted by the seat belt in the event of large forces acting on the vehicle occupant, for example during emergency braking or crash, in the seat and, thus, increasing the safety. Optimum protection can only be ensured, however, if the seat belt is correctly buckled by the vehicle occupant and shows no damage. Such damage may occur, for example, if the webbing or the locking tongue of the seat belt get clamped between a foldable rear seat back and the vehicle body.

The webbing of the seat belt is usually wound extendably on a belt retractor. Both seat belts including belt retractors integrated in the vehicle seat and belt retractors mounted on the vehicle body are known. The belt retractor can be mounted both in the area of the vehicle side, for example in the area of the B pillar or the C pillar of the vehicle, and in the area of the roof of the vehicle.

Seat belts comprising belt retractors integrated in the vehicle roof are frequently used in minivans, vans or the like, for example, which have removable vehicle seats so that the loading area can be increased by removing the vehicle seats, for example. Therefore, seat belts comprising a roof-integrated belt retractor usually have, instead of a fixedly mounted end fitting, an end fitting fastener to which the webbing can be detachably fixed. The end fitting fastener comprises, for example, an end fitting belt buckle and an end fitting locking tongue which can be engaged in the end fitting belt buckle to form the end fitting. For example, this enables the webbing, when not in use, to be wound completely onto the belt retractor by releasing/opening the end fitting lock.

SUMMARY

It is the object of the invention to provide a method by which a risk of damage of the seat belt can be at least reduced. In addition, it is the object of the invention to provide a method by which safe storage of the webbing of a seat belt can be ensured by a roof-integrated belt retractor. It is a further object of the invention to provide a seat belt system that is configured to carry out such a method to guarantee an improved protective effect.

To achieve the object, a method for a seat belt system in a vehicle is provided, wherein the seat belt system comprises a control unit and at least one seat belt having an extendable webbing and a webbing extension measuring device. The method includes the following steps of:
a) determining whether a vehicle seat is occupied,
b) determining whether the webbing is in a storage position, if the vehicle seat is not occupied, and
c) outputting a warning signal, in particular via an output device, if the webbing is not in the storage position.

The method according to the invention helps identify whether the webbing of the seat belt is in a correct storage position. In this way, damage on the vehicle body and/or on a rear seat back locking mechanism as well as specifically on the webbing and/or on locking elements of the seat belt can be avoided or at least the risk of damage can be reduced.

Preferably, the method according to the invention is permanently carried out. That is, signal monitoring is continued, if in step a) an occupancy of the vehicle seat or in step b) a storage position of the webbing is identified. Thus, the afore-described method according to the invention is carried out starting with step a), if the control unit identifies an occupancy of the vehicle seat or a storage position of the webbing.

If in step a) an occupancy of the vehicle seat or in step b) a storage position of the webbing is identified, alternatively the method according to the invention can be provided to be carried out starting with step a) again only when the control unit determines that the vehicle seat is no longer occupied or the webbing is no longer in the storage position.

If the vehicle seat is not occupied and the webbing is not in the storage position, the warning signal is preferably output until an occupancy of the vehicle seat or a storage position of the webbing is identified. Thus, even in this case, the method according to the invention is carried out again starting with step a).

Preferably, the method according to the invention therefore can be permanently performed repeatedly to avoid in particular damage of the seat belt or at least to reduce the risk of such damage.

In a preferred embodiment, it is determined whether the webbing is in the storage position by means of measuring the webbing extension by the webbing extension measuring device.

The webbing extension is measured absolutely or quasi absolutely by the webbing extension measuring device. Absolutely in this context means that an absolute value of the webbing extension is transmitted to the control unit by the webbing extension measuring device, i.e., that a particular value is associated with each webbing extension length in a related measuring scale. The measuring scale can be mounted or arranged both in the belt retractor on the spindle and on the webbing.

In quasi absolute measuring, each revolution of the belt reel and, resp., each webbing portion being extended is detected, so that it is always known exactly how far the webbing is extended. In quasi absolute measuring, the webbing extension measuring device is always active, that is, it "does not sleep" and has no standby mode in which no measuring takes place. In this way, webbing can be prevented from being extended or wound up without being detected by the seat belt system.

Thus, the actual webbing extension is known at any time during the absolute as well as the quasi absolute measuring and/or is reliably determinable. This is moreover advantageous, if by the determined webbing extension in further methods further conditions are to be checked, such as if a vehicle occupant is properly buckled up (so-called misuse detection) and/or if the vehicle occupant is in an improper seating position in the vehicle seat (so-called out-of-position detection).

Thanks to the absolute or quasi absolute measurement, the exact webbing extension is always known. It can easily be identified in this way, if the webbing is in a storage position.

Preferably, by means of the webbing measuring device also a webbing extension and webbing retraction rate can be determined apart from the webbing extension length. This allows to interrupt implementation of the method according to the invention by the control unit, if a predetermined webbing extension or webbing retraction rate is exceeded, from which a respective buckling or unbuckling operation can be concluded.

In one embodiment, a seat occupancy sensor detects whether the vehicle seat is occupied. The seat occupancy sensor may be in the form of a pressure sensor, for example, that is disposed in the seat surface of the vehicle seat. Preferably, also the weight/mass of the vehicle occupant can be determined by the pressure sensor.

In an alternative embodiment, the determination of whether the vehicle seat is occupied is carried out by checking whether the fastener of the seat belt is locked. For this purpose, the fastener of the seat belt includes a locking sensor. In a preferred embodiment, the fastener includes a locking tongue and a belt buckle having a belt buckle switch as locking sensor. The belt buckle switch helps detect whether the locking tongue is engaged in the belt buckle and, thus, the fastener of the seat belt is locked.

As a matter of course, for determining whether the vehicle seat is occupied and the method is to be continued by checking the webbing position according to step b), there may be required the condition of identifying that the fastener of the seat belt is locked as well as, by the seat occupancy sensor, that a vehicle occupant is sitting in the vehicle seat.

In accordance with the invention, for achieving the object moreover a method for a seat belt system in a vehicle is provided, the seat belt system comprising a control unit and at least one seat belt comprising a belt retractor integrated in the vehicle roof, an extendable webbing with a fastener and an end-fitting fastener as well as comprising a webbing extension measuring device. The method includes the following steps of:

a) determining whether the end fitting fastener and/or the fastener is/are locked,
b) determining whether the webbing is in a storage position, if the end fitting fastener and/or the fastener is/are not locked, and
c) outputting a warning signal, in particular via an output device, if the webbing is not in the storage position.

When determining the storage position, the control unit can differentiate specifically between a first and a second storage position.

Accordingly, in the first storage position, the end fitting fastener is locked, but the fastener is not locked. That is, the webbing is disposed in a storage position which substantially corresponds to the storage position of the webbing of a seat belt with a belt retractor mounted on the vehicle side. In the first storage position, the webbing is not wound completely onto the belt retractor integrated in the vehicle roof, specifically on the belt reel of the belt retractor integrated in the vehicle roof. The webbing not wound onto the belt retractor extends specifically between a belt deflector and the end fitting fastener.

In the second storage position, both the end fitting fastener and the fastener are not locked. In this way, the webbing is wound completely onto the belt retractor integrated in the vehicle roof, specifically on the belt reel of the belt retractor integrated in the vehicle roof. In the second storage position, the components of the end fitting fastener and of the fastener disposed on the webbing are adjacent to the belt deflector disposed in the ceiling headliner/at the roof of the vehicle.

By measuring the webbing extension by the webbing extension measuring device it is determined whether the webbing is in the storage position.

The webbing extension is measured absolutely or quasi absolutely by the webbing extension measuring device. Absolutely means that an absolute value of the webbing extension is transmitted to the control unit by the webbing extension measuring device, i.e., a specific value is associated with each webbing extension length in a related measuring scale. The measuring scale can be mounted or arranged both in the belt retractor on the spindle or the gearwheel and on the webbing.

In quasi absolute measuring, each revolution of the belt reel or each webbing portion that is extended is detected, so that it is always exactly known how far the webbing is extended. In quasi absolute measuring, the webbing extension measuring device is always active, i.e., it "does not sleep" and has no standby mode in which no measuring takes place. In this way, webbing can be prevented from being extended or wound up without being detected by the seat belt system.

Hence, the actual webbing extension is known at any time and/or is reliably determinable both in absolute and in quasi absolute measuring. This is moreover advantageous, if in further methods further conditions are to be checked by the determined webbing extension, for example whether a vehicle occupant is properly buckled up (so-called misuse detection) and/or whether the vehicle occupant is in an improper seating position in the vehicle seat (so-called out-of-position detection).

By the absolute or quasi absolute measuring, the exact webbing extension is always known.

The method according to the invention helps identify whether the webbing of the seat belt is in a correct first or second storage position.

Thus, the method can prevent, for example, the webbing from not being in one of the storage positions and thus swinging around inside the vehicle in an uncontrolled manner. In this way, for example damage on the vehicle body and/or the vehicle seats as well as on the webbing and/or the fastener elements of the seat belt can be avoided or at least the risk of such damage can be reduced. In addition, this helps protect the vehicle occupants, as they are informed about the incorrect storage position by the warning signal. Thus, also the vehicle occupants can be protected against components of the seat belt swinging around.

Preferably, in addition to the webbing extension length, also a webbing extension and webbing retraction rate can be determined by the webbing measuring device. This enables the control unit to interrupt implementation of the method according to the invention, if a predetermined webbing extension or webbing retraction rate is exceeded, from each of which a buckling or unbuckling operation or the fact that the webbing is moved, particularly by the vehicle occupant, from the first to the second storage position or from the second to the first storage position can be concluded.

Preferably, the method according to the invention is permanently carried out. That is, signal monitoring is continued, if in step a) a locked fastener and/or a locked end fitting fastener or in step b) the first or second storage position of the webbing is/are identified. Consequently, the above-described method according to the invention is carried out starting with step a), if the control unit identifies a locked fastener and a locked end fitting fastener, or identifies a locked end fitting fastener, a non-locked fastener and a webbing extension corresponding to the webbing extension associated with the first storage position, or identifies a non-locked end fitting fastener, a non-locked fastener and a webbing extension corresponding to the webbing extension associated with the second storage position.

If none of the above-described events is identified, the warning signal is output preferably until the control unit identifies a locked fastener and a locked end fitting fastener, or identifies a locked end fitting fastener, a non-locked fastener and a webbing extension corresponding to the webbing extension associated with the first storage position, or identifies a non-locked end fitting lock, a non-locked fastener and a webbing extension corresponding to the webbing extension associated with the second storage position. Thus, also in this case the method according to the invention is carried out again starting with step a).

It is detected by means of a locking sensor whether the fastener and/or the end fitting fastener is/are locked. In a preferred embodiment, the fastener comprises a locking tongue and a belt buckle with a belt buckle switch as locking sensor. The end fitting fastener comprises an end fitting locking tongue and an end fitting belt buckle with an end fitting belt buckle switch. It can be determined by the belt buckle switch and, resp., the end fitting belt buckle switch whether the locking tongue engages in the belt buckle and, resp., the end fitting locking tongue engages in the end fitting belt buckle and, consequently, the fastener and, resp., the end fitting fastener of the seat belt is locked.

The end fitting locking tongue and the end fitting belt buckle have a coding, for example by a specific corresponding shaping which prevents the locking tongue of the fastener from being inserted into the end fitting belt buckle of the end fitting fastener or the end fitting locking tongue from being inserted into the belt buckle of the fastener. The coding prevents the belt webbing of the seat belt from being wrongly fastened.

In accordance with the invention, for achieving the above-mentioned object, also a seat belt system for a vehicle, in particular for protecting a vehicle occupant, is provided, the seat belt system comprising a control unit and at least one seat belt including an extendable webbing and a webbing extension measuring device. In another embodiment, the seat belt system may comprise, additionally or alternatively, in addition to the control unit at least one seat belt having a belt retractor integrated in the vehicle roof, having an extendable webbing with a fastener and an end fitting fastener and having a webbing extension measuring device. The control unit of the seat belt system according to the invention is adapted to carry out the method according to the invention. The seat belt system offers the corresponding advantages of the above-mentioned method.

In a typical embodiment, the seat belt comprises a fastener, the fastener of the seat belt comprising a locking tongue and a belt buckle. For locking the fastener, the locking tongue is engageable with the belt buckle. The belt buckle can include a belt buckle switch as locking sensor so that it can be detected whether the locking tongue is engaged with the belt buckle.

In a preferred embodiment, the seat belt system has several seat belts. Preferably, one seat belt comprising an extendable webbing, a webbing extension measuring device and a fastener having a locking tongue and a belt buckle with a belt buckle switch is associated with a respective vehicle seat. In particular, the seat belt system may comprise both seat belts having a belt retractor integrated in the vehicle roof and seat belts having a belt retractor mounted on the vehicle side, for example in the area of the B pillar or C pillar. As a matter of course, also seat belts having a belt retractor integrated in the vehicle seat may be associated with the seat belt system.

The control unit of the seat belt system can be designed as a control unit separate from a vehicle control unit of the vehicle or, alternatively, can be integrated in the vehicle control unit, in particular in the onboard computer of the vehicle. If the control unit is designed separately from the vehicle control unit, the control unit is preferably designed so that it can communicate and exchange data with the vehicle control unit.

The control unit is connected at least to the webbing extension measuring device and a sensor for detecting the occupancy of the vehicle seat for signal transmission. Alternatively, or additionally, the control unit is connected at least to the webbing extension measuring device and to the locking sensor of the fastener as well as to the end fitting locking sensor of the end fitting fastener. Preferably, the control unit is moreover connected to further sensor elements of the seat belt system, such as the locking sensor of the fastener, the seat occupancy sensor of the vehicle seat and/or output devices and/or further sensors of the vehicle.

Furthermore, according to the invention, for achieving the above-mentioned object a vehicle comprising a seat belt system according to the invention offering the afore-listed advantages is provided.

BRIEF DESCRIPTION OF THE DRAWINGS

Further advantages and features will be evident from the following description and from the attached drawings, wherein.

DESCRIPTION

Figure 1:
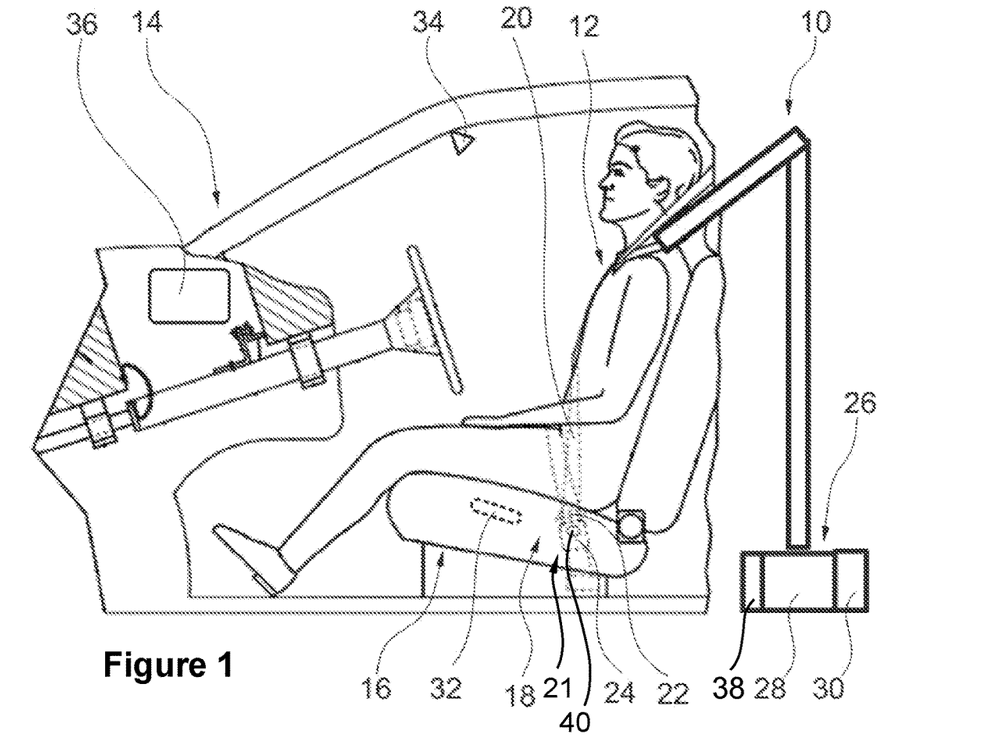
FIG. 1 shows a schematic view of a vehicle according to the invention comprising a seat belt system according to the invention.

FIG. 1 illustrates a seat belt system 10 for a vehicle occupant 12 in a vehicle 14, which is a passenger car in this case. The vehicle occupant 12 is sitting in a vehicle seat 16 of the vehicle 14. The vehicle 14 has a drive for accelerating the vehicle 14 and a braking device for decelerating the vehicle 14.

Figure 2:
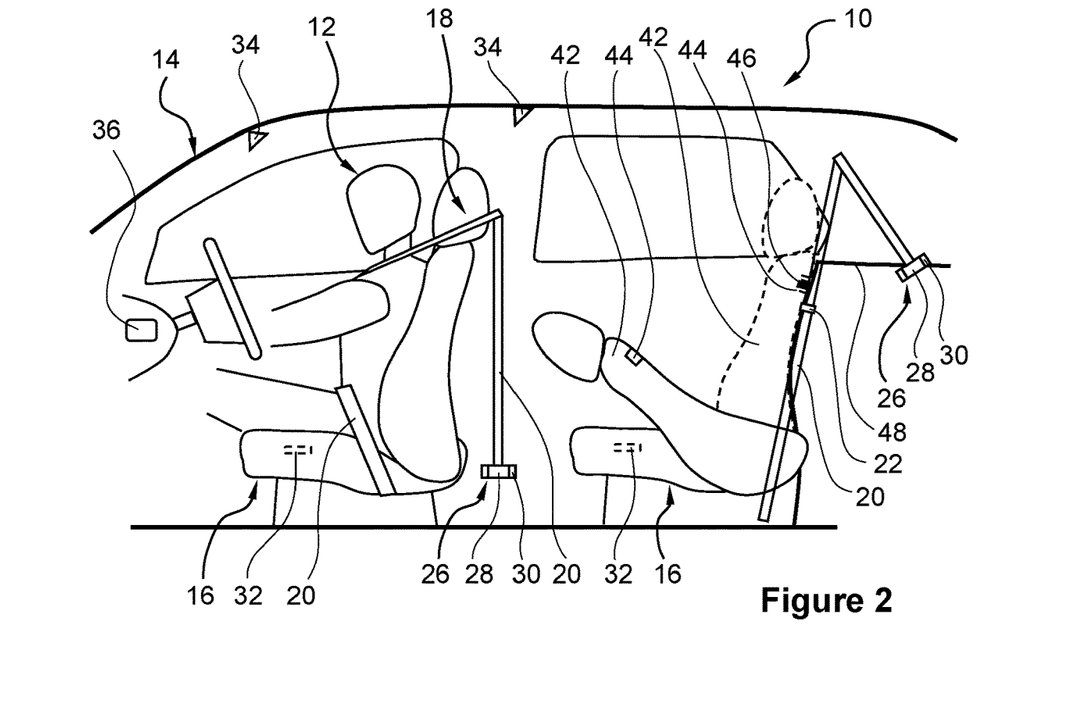
FIG. 2 shows a schematic view of a further vehicle according to the invention comprising a seat belt system according to the invention.

FIG. 2 additionally illustrates a vehicle 14 comprising a seat belt system 10 which includes several seat belts 18. The rear seat back 42 of the rear vehicle seat 16 is shown, in FIG. 2, in a folded position (solid line) and in a nominal position (broken line) in which a vehicle occupant 12 takes a seat in the rear vehicle seat 16. In order to fix the seat back 42 in the nominal position, latching elements 44 and 46 are disposed in the seat back 16 and at the inner vehicle body 48.

In alternative embodiments, the seat belts 18 of the seat belt system 10 may be provided for any vehicle seats 16 in a vehicle 14 to protect the respective vehicle occupant 12 in a case of restraint such as a crash.

In particular, the seat belt system 10 is suitable for use in any vehicles, particularly autonomously driving vehicles.

The seat belt system 10 comprises at least one seat belt 18. The seat belt 18 comprises an extendable webbing 20 and a fastener 21 comprising, in the shown embodiment, a locking tongue 22 and a belt buckle 24, wherein the locking tongue 22 is engageable in the belt buckle to lock the fastener. The belt buckle 24 moreover has a locking sensor 40 in the form of a belt buckle switch 40. The webbing 20 serves to restrain the vehicle occupant 12 in the vehicle seat 16 when the belt buckle 24 is locked. The belt buckle 24 is locked by the locking tongue 22 being inserted into the belt buckle 24 and engaging with the latter.

Further, the seat belt 18 comprises a belt retractor 26 with a belt reel 28 onto which the webbing 20 is partly wound. In this way, the webbing 20 and, thus, the seat belt 18 are extendably accommodated in the vehicle 14. The seat belt 18 shown in FIG. 1 further comprises a reversible belt tensioner 38.

In an alternative embodiment, the webbing 20 may be provided extendably in any way.

The belt reel 28 has a webbing extension measuring device 30, for example in the form of a reel rotation sensor by which the rotation of the belt reel 28 and, thus, the length of the currently extended webbing 20, the so-called webbing extension, is absolutely detected. In other words, the webbing extension is the length of the part of the webbing 20 that is wound off the belt reel 28. Such measuring in which the exact webbing extension is known is performed by an absolute or quasi absolute measuring. The absolute or quasi absolute measuring offers especially the advantage that a storage position of the webbing 20 can be determined in which the webbing 20 is completely wound on the belt reel 28.

Basically, the webbing extension measuring device 30 may be any device that is adapted to determine the exact webbing extension. For example, the webbing extension measuring device 30 can comprise indirect or direct measuring sensors which measure the webbing extension, e.g., by direct scanning (such as via a friction gear) and/or indirect scanning (such as via a laser sensor scanning a measuring scale integrated on and/or in the webbing or in a belt retractor component).

The seat belt system 10 further comprises an output device 34 in the form of a display element disposed in the visual range of the vehicle occupant 12.

In an alternative embodiment, the output device 34 may be substantially any output device that is suitable for transmitting information to the vehicle occupant 12, for example a loudspeaker or a haptic feedback element. Of course, the output device 34 can also be adapted to provide the vehicle occupant 12 with the information simultaneously in the form of different signals, specifically in an acoustic, visual and/or haptic manner.

As a matter of course, the output device 34 can be arranged at any place in the vehicle 14 (see FIG. 2) which is suited for transmitting the information to the vehicle occupant 12. In addition, or alternatively, the output device 34 can be provided by output devices which are already existing in the vehicle 14, such as loudspeakers, or can be integrated in the same, such as in an instrument panel of the vehicle 14.

The output device 34 serves at least for outputting a warning signal that warns and informs the vehicle occupant if the webbing 20 of the seat belt 18 is not in the storage position.

In addition, the vehicle seat 16 comprises a seat occupancy sensor which is configured, in the shown embodiments, as a pressure sensor 32 arranged in the seat surface of the vehicle seat 16. The pressure sensor 32 specifically helps identify whether a vehicle occupant 12 is sitting in the vehicle seat 16. In addition, there may be the possibility of a weight/mass of the vehicle occupant 12 being determined via the pressure sensor 32.

The webbing extension measuring device 30, the pressure sensor 32, the output device 34 and the belt buckle switch 40 are connected to a control unit 36 of the seat belt system 10 for signal transmission.

The control unit 36 in the present case is integrated in the vehicle control unit of the vehicle 14, here the onboard computer of the vehicle 14. In an alternative embodiment, the control unit 36 of the seat belt system 10 can be separately provided, wherein it is preferably connected to the onboard computer of the vehicle 14 for signal transmission.

The control unit 36 is adapted to control the aforementioned systems and to carry out the following method to operate the seat belt system 10.

Preferably, from unlocking the vehicle 14 the control unit 36 checks whether the webbing 20 of the seat belts 18 is arranged in a correct storage position.

In an alternative embodiment, the control unit 36 can start checking only when, after unlocking the vehicle 14, a vehicle door is opened by a vehicle occupant 12.

In a first step, it is determined whether one of the vehicle seats 16 is occupied. For determining whether the vehicle seat 16 is occupied, the measured values/data of the pressure sensors 32 in the seat surfaces of the vehicle seats 16 and/or the measured values/data of the belt buckle switches 40 are taken into account by the control unit 36

In a further step, the control unit 36 determines whether the webbing 20 is in a storage position. This check is carried out, as a rule, when in the first step it is identified that the vehicle seat 16 is not occupied. Alternatively, the check whether the webbing 20 is in the storage position can also be carried out when in the first step an occupancy of the vehicle seat 16 is identified. Accordingly, it can be checked, for example, whether the vehicle occupant 12 is properly buckled up (so-called misuse detection). In this way, for example wrong application of the seat belt 18 can be concluded from simultaneous determination of a locking tongue 22 inserted in the belt buckle 24 by the belt buckle switch 40 and of a webbing 20 present in the storage position.

The storage position of the webbing 20 is determined via the webbing extension of the webbing 20 which is determined by the control unit 36 via the webbing extension measuring device 30.

If it is determined by the control unit 36 that the vehicle seat 16 is not occupied and the webbing 20 is not in the storage position, a warning signal is output via the output device 34 to inform the vehicle occupant 12 of the incorrect storage position of the webbing 20. Accordingly, the vehicle occupant 12 is particularly also informed about the fact on which of the vehicle seats 16 the webbing 20 of the seat belt 18 is not in the correct storage position.

The warning signal may be provided to be output only after a specified time interval. In this way, an unnecessary warning signal can be prevented from being output to the vehicle occupant during a buckling or unbuckling operation.

For example, also a check of the correct storage position of the webbing can be provided to be carried out only after a specific time interval after the belt buckle switch has identified opening of the fastener 21.

The method according to the invention can draw the attention of the vehicle occupant 12 to the fact, for example, that the webbing 20 of the seat belt 18 of a particular vehicle seat 16 is not arranged in the correct storage position.

Moreover, it can be provided, that, if the control unit 36 determines that the vehicle seat 16 is not occupied and the webbing 20 is not in the storage position, an automatic seat back reclining of the seat backs of the vehicle seats 16, in particular the rear seat backs 42 of the rear vehicle seats 16, is deactivated. In this way, the webbing 20 and/or the locking tongue 22 can be prevented from being clamped between the inner vehicle body 48 and the rear seat back 42, thereby helping prevent the components of the seat belt 18 and/or the latching elements 44 and 46 from being damaged.

If the seat back is manually reclined, the vehicle occupant 12 is informed by the output device 34 by a warning signal of the incorrect storage position of the webbing to prevent the components of the seat belt 18 and/or of the latching elements 44 and 46 from being damaged.

In addition, the warning by the warning signal can also prevent the body of the vehicle 14 or the components of the seat belt 18 from being damaged, which damage may occur, for example, by clamping the webbing 20 and/or the locking tongue 22 when the vehicle door is locked, if the webbing 20 is not completely retracted and, thus, is not in the correct storage position.

Figure 3:
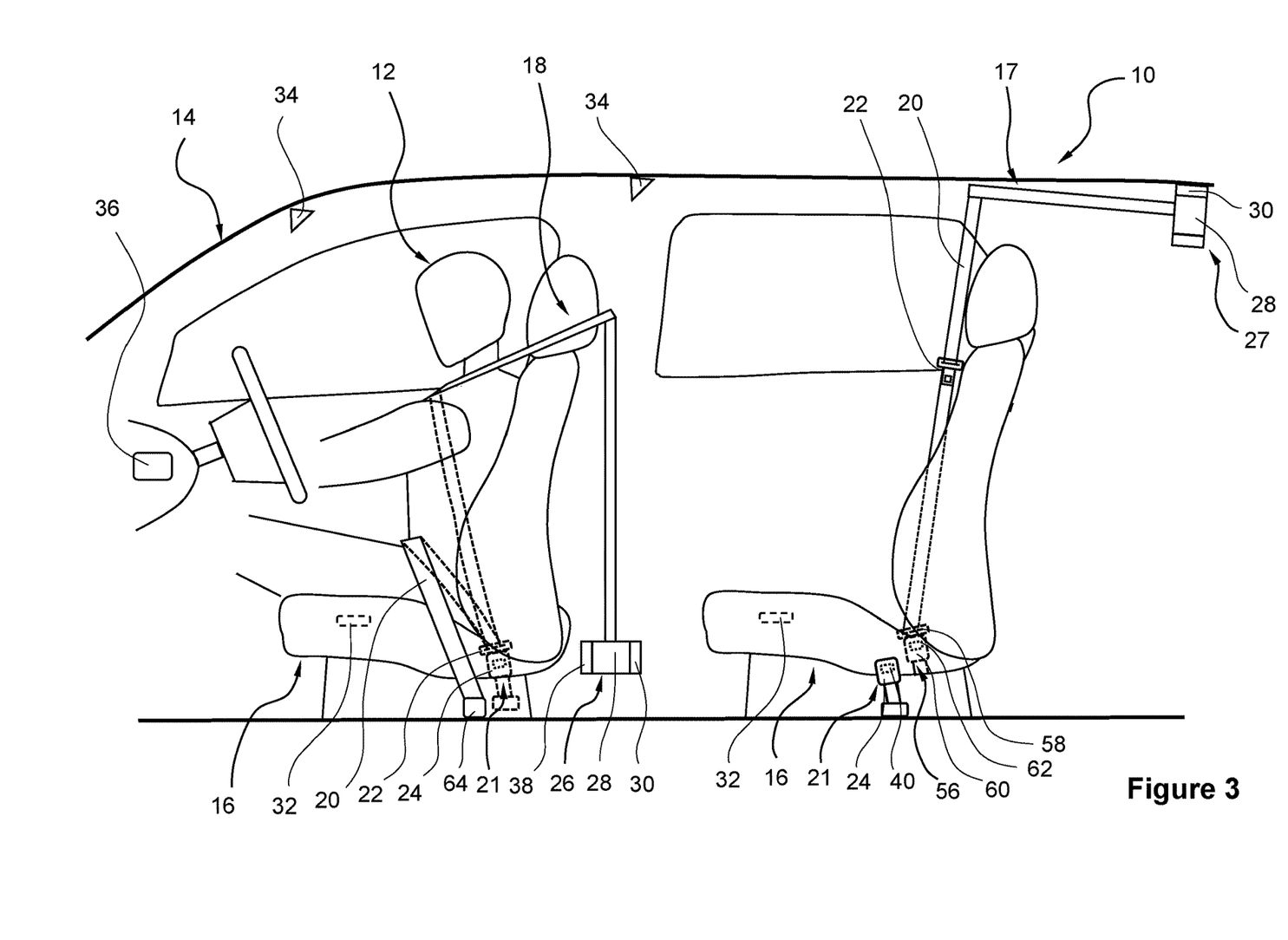
FIG. 3 shows a schematic view of a third vehicle according to the invention comprising a seat belt system according to the invention.

FIG. 3 equally illustrates a seat belt system 10 for a vehicle occupant 12 in a vehicle 14, which is a passenger car in this case. The vehicle occupant 12 is sitting in a front vehicle seat 16 of the vehicle 14. The vehicle 14 has a drive for accelerating the vehicle 14 and a braking device for decelerating the vehicle 14. Moreover, a rear vehicle seat 16 including a seat belt 17 of the seat belt system 10 is shown.

Figure 4:
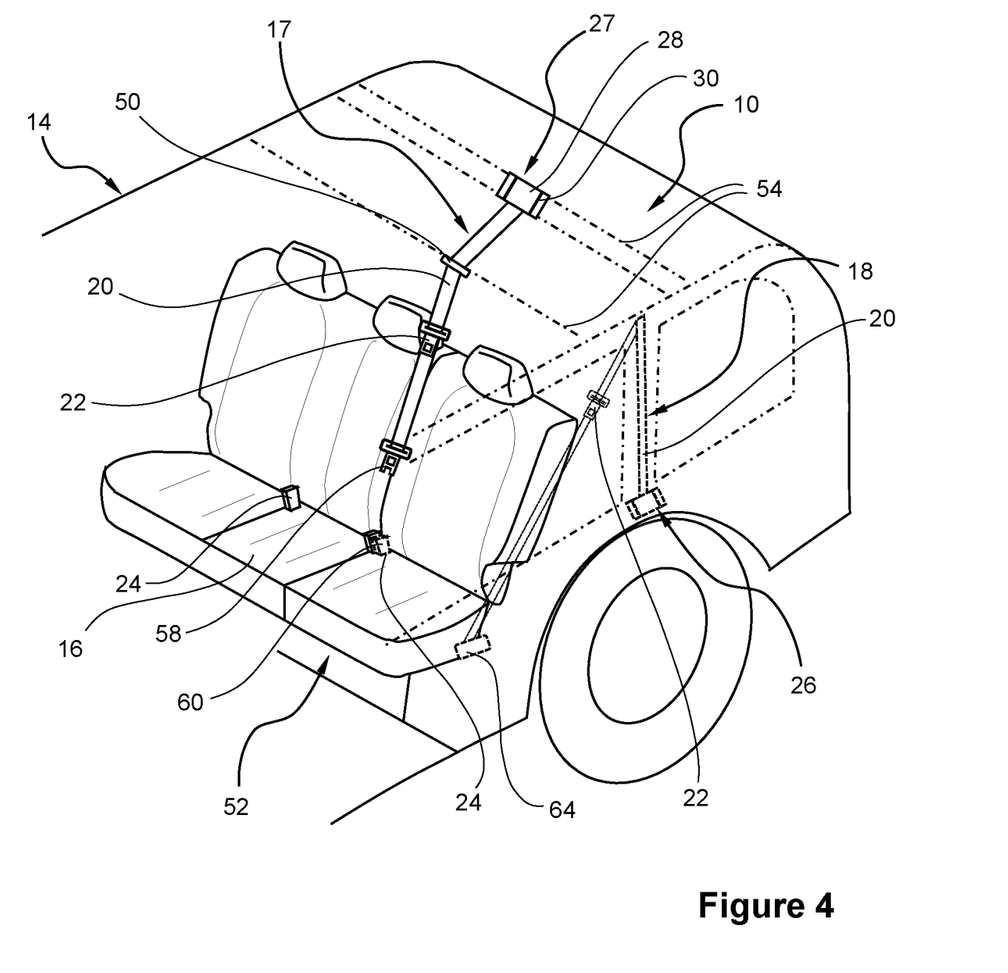
FIG. 4 shows a schematic perspective partial view of the rear portion of a fourth vehicle according to the invention comprising a seat belt system according to the invention.

FIG. 4 moreover illustrates in a perspective view the rear portion of the vehicle 14 comprising a seat belt system 10 which includes a seat belt 18 and a seat belt 17. The rear vehicle seat 16 which the seat belt 17 is associated with in this embodiment, is part of a rear bench 52 of the vehicle 14 which is configured to be removable, for example to increase the loading area/the trunk volume of the vehicle 14.

In particular, the seat belt system 10 is suited for use in any vehicles, particularly in autonomously driving vehicles.

The seat belt system 10 comprises at least one seat belt 17 including a belt retractor 27 integrated in the vehicle roof. The seat belt 17 comprises an extendable webbing 20, a fastener 21 comprising a locking tongue 22 and a belt buckle 24 in the shown embodiment, wherein the locking tongue 22 is engageable in the belt buckle 24 for locking the fastener 21, and an end fitting fastener 56 comprising an end fitting locking tongue 58 as well as an end fitting belt buckle 60 in the shown embodiment, the end fitting locking tongue 58 being engageable in the end fitting belt buckle 60 for locking the end fitting fastener 56. The belt buckle 24 moreover has a locking sensor 40 in the form of a belt buckle switch 40 and the end fitting belt buckle 60 has an end fitting locking sensor 62 in the form of an end fitting belt buckle switch 62. The extendable webbing 20 serves for restraining a vehicle occupant 12 in the vehicle seat 16, when the belt buckle 24 and the end fitting belt buckle 60 are locked. The belt buckle 24 and, resp., the end fitting belt buckle 60 is locked by the locking tongue 22 being inserted into the belt buckle 24 and, resp., the end fitting locking tongue 56 being inserted into the end fitting belt buckle 60, and engaging with the latter.

Further, the seat belt 17 comprises a belt retractor 27 integrated in the vehicle roof having a belt reel 28 on which the webbing 20 is partly wound. The webbing 20 and thus the seat belt 17 in this way are extendably accommodated in the vehicle 14.

In the shown embodiments of FIGS. 3 and 4, the seat belt system 10 moreover comprises at least one seat belt 18 having a belt retractor 28 mounted in the area of the vehicle side on the vehicle body. The seat belt 18 comprises an extendable webbing 20 and a fastener 21 which, in the illustrated embodiment, comprises a locking tongue 22 and a belt buckle 24, the locking tongue 22 being adapted to be engaged in the belt buckle 24 for locking the fastener 21. The webbing 20 of the seat belt 18 is connected to the vehicle 14 tightly and not releasably by the vehicle occupant 12 via an end fitting 64.

The seat belt 18 shown in FIG. 3 further comprises a belt tensioner 38. As a matter of course, also the seat belt 17 may comprise a belt tensioner 38.

The belt reel 28 of the seat belt 17 includes a webbing extension measuring device 30, for example in the form of a reel rotation sensor by means of which the rotation of the belt reel 28 and, thus, the length of the currently extended webbing 20, viz. the so-called webbing extension, is absolutely detected. The belt reel 28 of the seat belt 18 includes preferably also a webbing extension measuring device 30 for measuring the webbing extension of the webbing 20.

In other words, the webbing extension is the length of the part of the webbing 20 that is wound off the belt reel 28. Such measuring in which the exact webbing extension is known is made by an absolute or quasi absolute measuring. The absolute or quasi absolute measuring offers the particular advantage that a storage position of the webbing 20 can be determined in which the webbing 20 is wound completely on the belt reel 28.

Basically, the webbing extension measuring device 30 may be any device that is adapted to determine the exact webbing extension. For example, the webbing extension measuring device 30 may comprise indirect or direct measuring sensors which measure the webbing extension for example by direct scanning (such as via a friction wheel) and/or indirect scanning (such as via a laser sensor that scans a measuring scale integrated on and/or in the webbing and/or in a belt retractor component).

The seat belt system 10 further comprises an output device 34 in the form of a display element disposed in the visual range of the vehicle occupant 12.

In an alternative embodiment, the output device 34 may be substantially any output device suited for transmitting information to the vehicle occupant 12, for example a loudspeaker or a haptic feedback element. Of course, the output device 34 may also be adapted to provide the information to the vehicle occupant 12 simultaneously in the form of different signals, in particular in an acoustic, visual and/or haptic manner.

As a matter of course, the output device 34 may be arranged at any place in the vehicle 14 that is suited for transmitting the information to the vehicle occupant 12. In addition, or alternatively, the output device 34 can be provided by output devices already existing in the vehicle 14, such as loudspeakers, or can be integrated in the same, such as in an instrument panel of the vehicle 14.

The output device 34 serves at least for outputting a warning signal that warns and informs the vehicle occupant, if the webbing 20 of the seat belt 18 is not in the first or second storage position and, consequently, there is the risk of components of the seat belt 18, such as the locking tongue 22 disposed on the webbing 20 and/or the end fitting locking tongue 22, may swivel around.

In addition, the vehicle seats 16 comprise a seat occupancy sensor which in the shown embodiments is in the form of a pressure sensor 32 disposed in the seat surface of the vehicle seat 16. It can be identified in particular via the pressure sensor 32 whether a vehicle occupant 12 is sitting in the vehicle seat 16. In addition, it may be possible to determine a weight/mass of the vehicle occupant 12 via the pressure sensor 32.

The webbing extension measuring device 30, the output device 34, the belt buckle switch 40 and the end fitting belt buckle switch 62 are connected to a control unit 36 of the seat belt system 10 for signal transmission. In addition, here also the pressure sensors 32 as well as the belt buckle switches 40 of the seat belts 17, 18 are connected to the control unit for signal transmission.

In the present case, the control unit 36 is integrated in the vehicle control unit of the vehicle 14, in this case the onboard computer of the vehicle 14. In an alternative embodiment, the control unit 36 of the seat belt system 10 can be separately provided, being preferably connected to the onboard computer of the vehicle 14 for transmitting signals.

The control unit 36 is adapted to control the aforementioned systems and to carry out the following method to operate the seat belt system 10.

Preferably, from unlocking the vehicle 14 (after the vehicle 14 was not used before), the control unit 36 checks whether the webbing 20 of the seat belt 17 is disposed in a correct first or second storage position.

In an alternative embodiment, the control unit 36 can start the checking only when, after unlocking the vehicle 14, a vehicle door is opened by a vehicle occupant 12.

In a first step, it is determined whether the end fitting fastener 56 and/or the fastener 21 is/are locked. For determining whether the end fitting fastener 56 and/or the fastener 21 is/are locked, the measured values/data of the belt buckle switch 40 and/or of the end fitting belt buckle switch 62 are used by the control unit 36.

In a further step, it is determined by the control unit 36 whether the webbing 20 is in a first or second storage position.

The checking whether the webbing is in the first storage position takes place, if it is determined that the end fitting fastener 56 is locked, but the fastener 21 is not locked. The first storage position thus corresponds substantially to the storage position of the seat belt 18, the belt retractor 26 of which is mounted on the vehicle side and the webbing 20 of which is tightly connected to the vehicle 14 via the end fitting 64.

In the first storage position (see FIG. 3), the webbing 20 is not wound completely on the belt retractor 27 integrated in the vehicle roof, in particular on the belt reel 28 of the belt retractor 27 integrated in the vehicle roof. The webbing 20 which is not wound on the belt retractor 27 integrated in the vehicle roof extends particularly between the belt deflector 50 disposed in/at the vehicle roof 54 and the end fitting fastener 56.

The checking whether the webbing is in the second storage position takes place, if it is determined that both the end fitting fastener 56 and the fastener 21 are not locked.

In the second storage position, the webbing 20 is wound completely on the belt retractor 27 integrated in the vehicle roof, particularly on the belt reel 28 of the belt retractor 27 integrated in the vehicle roof. In the second storage position, the components of the end fitting fastener 56 and of the fastener 21 disposed on the webbing are adjacent to the belt deflector 50 disposed in/at the vehicle roof 54 of the vehicle 14.

The determination whether the webbing is in the storage position is carried out by means of the measuring of the webbing extension by the webbing extension measuring device, a specific webbing extension length being stored both for the first and the second storage position in the control unit 36.

If it is determined by the control unit 36 that the webbing 20 is not in the first or second storage position, a warning signal is output via the output device 34 to inform the vehicle occupant 12 about the incorrect storage position of the webbing 20. Accordingly, the vehicle occupant 12 can also be informed particularly about the fact at which of the vehicle seats 16 the webbing of the seat belt 18 is not in the correct storage position, if the vehicle 14 includes plural seat belts 18 which comprise a fastener 21 and an end fitting fastener 56.

The warning signal may be provided to be output only after a predetermined time interval. In this way, for example, an unnecessary warning signal can be prevented from being output to the vehicle occupant 12 during a buckling or unbuckling operation. For example, a checking of the correct first or second storage position of the webbing 20 can also be provided to be carried out only following a predetermined time interval after the belt buckle switch 40 has identified an opening of the fastener 21, or the end fitting belt buckle switch 62 has identified an opening of the end fitting fastener 56.

The method according to the invention can draw the attention of the vehicle occupant 12 to the fact, for example, that the webbing 20 of the seat belt 18 is not disposed in the correct first or second storage position.

The seat belt system 10 is not restricted to one single seat belt 17, 18 whose correct webbing storage is checked, but may comprise plural seat belts 17, 18 whose correct storage position is checked in particular simultaneously.

The invention is not limited to the shown embodiment. In particular, individual features of one embodiment may be combined with any features of other embodiments, particularly independently of the other features of the corresponding embodiments.

The invention claimed is:

1. A method for a seat belt system (10) in a vehicle (14), the seat belt system (10) comprising a control unit (36) and at least one seat belt (18) having an extendable webbing (20) and a webbing extension measuring device (30), comprising the steps of:
 a) determining whether a vehicle seat (16) is occupied,
 b) determining whether the webbing (20) is in a storage position, if the vehicle seat (16) is not occupied, and
 c) outputting a warning signal, in particular via an output device (34), if the webbing (20) is not in the storage position and the vehicle seat is not occupied.

2. The method for a seat belt system (10) according to claim 1, wherein, if in step a) the vehicle seat (16) is determined to be occupied or in step b) the webbing (20) is determined to be in the storage position, steps a) and b) are continued and the method according to claim 1 is carried out again.

3. The method for a seat belt system (10) according to claim 1, wherein the warning signal is output until an occupancy of the vehicle seat (16) is determined to be occupied or the webbing (20) is determined to be in the storage position.

4. The method for a seat belt system (10) according to claim 1, wherein the occupancy of the vehicle seat (16) is determined by checking whether a fastener (21) of the seat belt is locked, in particular wherein the fastener (21) comprises a locking tongue (22) and a belt buckle (24) with a belt buckle switch (40), and it is determined by means of the belt buckle switch whether the locking tongue (22) is engaged in the belt buckle (24).

5. The method for a seat belt system (10) according to claim 1, wherein the determination whether the webbing (20) is in the storage position is carried out by means of a webbing extension determined by the webbing extension measuring device (30).

6. The method for a seat belt system (10) according to claim 1, wherein the determination whether the vehicle seat (16) is occupied is made by means of a seat occupancy sensor (32).

7. The method according to claim 1, wherein the webbing extension is measured absolutely or quasi absolutely.

8. A seat belt system (10) for a vehicle (14), in particular for the protection of a vehicle occupant (12), wherein the seat belt system (10) comprises a control unit (36) and at least one seat belt (18) having an extendable webbing (20) and a webbing extension measuring device (30) and/or comprises at least one seat belt (17) having a belt retractor (27) integrated in the vehicle roof, having an extendable webbing (20) with a fastener (21) and an end fitting fastener (56) and having a webbing extension measuring device (30), the control unit (36) being adapted to carry out the method according to claim 1.

9. A vehicle (14), comprising the seat belt system (10) according to claim 8.

10. A method for a seat belt system (10) in a vehicle (14), wherein the seat belt system (10) comprises a control unit (36) and at least one seat belt (17) having a belt retractor (27) integrated in the vehicle roof, an extendable webbing (20) with a fastener (21) and an end fitting fastener (56) and a webbing extension measuring device (30), including the steps of:
 a) determining whether the end fitting fastener (56) and the fastener (21) are locked,
 b) determining whether the webbing (20) is in a first storage position if the end fitting fastener (56) and the fastener (21) are both not locked,
 c) outputting a warning signal via an output device (34) if the webbing (20) is not in the first storage position when the end fitting fastener (56) and the fastener (21) are both not locked, and
 d) determining whether the webbing (20) is in a second storage position if the end fitting fastener (56) is locked and the fastener (21) is not locked,
 the warning signal being output via the output device (34) when the webbing (20) is not in the second storage position while the end fitting fastener (56) is locked and the fastener (21) is not locked, and when the webbing (20) is not in the first storage position while the end fitting fastener (56) and the fastener (21) are both locked, the webbing (20) in the first storage position being completely wound onto the belt retractor (27) and the webbing (20) in the second storage position being only partially wound onto the belt retractor (27).

11. The method for a seat belt system (10) according to claim 10, wherein the end fitting fastener (56) comprises an end fitting locking tongue (58) and an end fitting belt buckle (60) with an end fitting belt buckle switch (62), wherein it is determined by means of the end fitting belt buckle switch (62) whether the end fitting fastener (56) is locked.

12. The method for a seat belt system (10) according to claim 10, wherein the fastener (21) comprises a locking tongue (22) and a belt buckle (24) with a belt buckle switch (40), wherein it is determined by means of the belt buckle switch (40) whether the fastener (21) is locked.

13. The method for a seat belt system (10) according to claim 10, wherein the determination whether the webbing (20) is in the first storage position comprises determining via the webbing extension measuring device (30) whether the webbing is completely wound onto the belt retractor (27).

14. The method according to claim 13, wherein the webbing extension measuring device (30) measures a webbing extension of the webbing (20) absolutely or quasi absolutely.

15. A seat belt system (10) for a vehicle (14), in particular for the protection of a vehicle occupant (12), wherein the seat belt system (10) comprises a control unit (36) and at least one seat belt (18) having an extendable webbing (20) and a webbing extension measuring device (30) and/or comprises at least one seat belt (17) having a belt retractor (27) integrated in the vehicle roof, having an extendable webbing (20) with a fastener (21) and an end fitting fastener (56) and having a webbing extension measuring device (30), the control unit (36) being adapted to carry out the method according to claim 10.

16. A vehicle (14), comprising the seat belt system (10) according to claim 15.

17. The method for a seat belt system (10) according to claim 10, wherein the warning signal is output until it is determined that the webbing (20) is in the first or second storage position.

18. The method for a seat belt system (10) according to claim 10, wherein the determination of whether the webbing (20) is in the first storage position comprises determining via the webbing extension measuring device (30) whether the webbing (20) is completely wound onto the belt retractor (27), and the determination of whether the webbing (20) is in the second storage position comprises determining via the webbing extension measuring device (30) whether a predetermined length of webbing (20) is wound onto the belt retractor (27), the predetermined length of webbing being less than a length of the webbing (20) wound onto the belt retractor (27) when the webbing (20) is completely wound onto the belt retractor (27).

* * * * *